(12) United States Patent
Ryecroft et al.

(10) Patent No.: US 12,332,622 B2
(45) Date of Patent: Jun. 17, 2025

(54) MONITORING A FIELD MACHINE

(71) Applicant: Control Station Ltd., Leeds (GB)

(72) Inventors: Gary Ryecroft, Leeds (GB); Damian Allinson, Leeds (GB)

(73) Assignee: Control Station Ltd., Leeds (GB)

( * ) Notice: Subject to any disclaimer, the term of this patent is extended or adjusted under 35 U.S.C. 154(b) by 377 days.

(21) Appl. No.: 17/795,924

(22) PCT Filed: Jan. 28, 2021

(86) PCT No.: PCT/GB2021/050200
§ 371 (c)(1),
(2) Date: Jul. 28, 2022

(87) PCT Pub. No.: WO2021/152316
PCT Pub. Date: Aug. 5, 2021

(65) Prior Publication Data
US 2023/0097557 A1     Mar. 30, 2023

(30) Foreign Application Priority Data

Jan. 28, 2020 (GB) .................................. 2001189

(51) Int. Cl.
*G05B 19/042* (2006.01)
*H04L 67/12* (2022.01)

(52) U.S. Cl.
CPC .......... *G05B 19/0423* (2013.01); *H04L 67/12* (2013.01)

(58) Field of Classification Search
CPC ... G05B 19/0423; G05B 19/054; H04L 67/12; H04L 67/52; H04L 67/015; H04L 2012/40215; H04L 2012/40228
See application file for complete search history.

(56) References Cited

U.S. PATENT DOCUMENTS

| 8,131,281 B1 * | 3/2012 | Hildner | H04L 63/30 |
| | | | 455/418 |
| 2009/0028184 A1 * | 1/2009 | Carpman | G05B 19/058 |
| | | | 370/466 |

(Continued)

FOREIGN PATENT DOCUMENTS

| CN | 201681280 U | 12/2010 |
| CN | 102143458 A | 8/2011 |

(Continued)

OTHER PUBLICATIONS

PCT International Search Report and Written Opinion dated Mar. 29, 2021, in connection with PCT/GB2021/050200 filed on Jan. 28, 2021.

(Continued)

*Primary Examiner* — Nicholas Klicos
(74) *Attorney, Agent, or Firm* — Downs Rachlin Martin PLLC

(57) ABSTRACT

A communication module (100) for monitoring a machine (200) includes a serial interface (110) connectable to a serial interface of the machine (200); a telecommunications interface (120) connectable to a telecommunications network; and a control unit (130) configured to transmit data received via the serial interface (110) to a monitoring server (300) via the telecommunications interface (120). The module (100) provides network connectivity to industrial machinery, thereby providing a means of remotely monitoring such machines, including legacy machines which may not otherwise support network connectivity.

18 Claims, 5 Drawing Sheets

(56) References Cited

U.S. PATENT DOCUMENTS

| | | | |
|---|---|---|---|
| 2010/0274366 A1* | 10/2010 | Fata | H04L 12/2818 |
| | | | 700/8 |
| 2014/0172121 A1 | 6/2014 | Li et al. | |
| 2016/0021040 A1* | 1/2016 | Frei | H04L 61/5061 |
| | | | 709/224 |
| 2018/0338348 A1* | 11/2018 | Praveen R. | H04L 67/566 |
| 2018/0376358 A1 | 12/2018 | Uppili et al. | |
| 2019/0186975 A1* | 6/2019 | Pennebaker, III | H01F 7/0252 |
| 2020/0350778 A1* | 11/2020 | Nemecek | H04L 67/34 |

FOREIGN PATENT DOCUMENTS

| | | |
|---|---|---|
| CN | 204116932 U | 1/2015 |
| CN | 106375124 A | 2/2017 |
| CN | 108648433 A | 10/2018 |
| CN | 208739136 U | 4/2019 |
| WO | 2006015245 A2 | 2/2006 |
| WO | 2021152316 A1 | 8/2021 |

OTHER PUBLICATIONS

UK Intellectual Property Office Search Report dated Jul. 15, 2020, in connection with Application No. GB2001189.6, filed on Jan. 28, 2020.

* cited by examiner

As a Modbus Slave the module can be configured for two operating modes:
Passive slave - The MC01 is not addressed directly, it harvests data off the bus by eavesdropping. Ideal for retrofit and legacy applications.
Active slave - The MC01 is specifically written to by the Modbus master PLC. Suited to new applications.

MONITORING A FIELD MACHINE

FIELD

This invention relates to a communication module for monitoring a machine. The invention further relates to a communication system for monitoring a machine, and a method of monitoring a machine.

BACKGROUND

With the move to widespread availability of data connectivity, we are seeing an increase in the number of connected devices. Users want to not only communicate by voice and electronic messages and view web pages, but also remotely see the status of their devices and control them. For example, it is desirable to remotely monitor home security systems, heating system, CCTV and the like.

The desire to remotely monitor devices also applies in the commercial world where companies have an interest in the state of assets or machines that are located elsewhere. References to machines in this context will be understood to be references to any electrical equipment that performs a functional task. Examples include motorised or mechanical devices such as powered doors, roller shutters, pumping stations, dock levellers, and car park barriers. Further examples include walk-in freezers, solar panels, air conditioning units, heating/ventilation units, horticultural irrigations systems and so on. It is desirable to monitor such devices to in order to help plan maintenance, optimise energy usage, and identify unexpected stoppages. The connectivity required for these systems would typically make data available from the machine using one of the following methods:

Wired LAN ethernet connection via broadband gateway
Wireless LAN wi-fi connection via broadband gateway
Mobile data via Global System for Mobile communication (GSM) mobile data network The data may be stored on the machine and remotely viewed or uploaded to a separate location for storage and use.

Problems arise in that the installation of wired and wireless LAN infrastructure can be prohibitively expensive. For example, it may not be possible to install wired ethernet connections to each dock leveller in a loading bay of a large warehouse without undertaking significant remedial works.

Furthermore, installing, configuring, commissioning and operating the remote connection to the machine requires a diverse variety of skills and abilities that rarely exist within the same department. For example, it may be necessary to establish the data connection, set up firewall rules, grant access permission, manage storage, and configure the interface to the machine control system. Quite often the steps also need to be performed with different stakeholders or vendors, such as the supplier of asset to be monitored, communication device supplier, ISP or GSM data supplier, data storage supplier, and machine manufacturer. In a commercial environment this is time consuming, expensive, and particularly a problem for low-cost machines where the costs of connectivity can outweigh the benefit of being able to remotely monitor the machine.

Further issues arise in that not all machines have network interfaces capable of supplying data suitable for the required remote monitoring. Particular problems exist where legacy machines need to be connected and the operating software cannot be changed to integrate with networking devices.

It is an aim of the disclosure to address these difficulties, and any other difficulties that would be apparent to the skilled person from the description herein. It is a further aim of the disclosure to provide a communication module that can be readily retrofitted to a machine in order to provide remote monitoring thereof.

SUMMARY

According to the present invention there is provided an apparatus and method as set forth in the appended claims. Other features of the invention will be apparent from the dependent claims, and the description which follows.

According to a first aspect of the disclosure there is provided a communication module for monitoring a machine, comprising:

a serial interface connectable to a serial interface of the machine;

a telecommunications interface connectable to a telecommunications network, wherein the telecommunications interface is a GSM module configured to communicate over a GSM network; and a control unit configured to control operation of the communication module, the control unit being further configured to transmit data received via the serial interface to a monitoring server via the telecommunications interface, the control unit being further configured to receive configuration data via the telecommunications interface, wherein the configuration data comprises: machine type data indicating data items of the machine to be monitored, retrieved from the machine via the serial interface and transmitted via the telecommunication interface; periodicity data indicating a periodicity of transmissions of the retrieved data items to be made by the communication module via the telecommunication interface; and operating configuration data, indicating the desired operating configuration of the communication module according to which the data items are to be retrieved.

The serial interface may be a Modbus interface configured to communicate with the machine using a Modbus protocol. The serial interface may be configured to communicate with a programmable logic controller (PLC) of the machine. The serial interface may comprise a serial port, connectable to a serial port of the machine via a serial cable.

The control unit may be configured to periodically transmit data over the telecommunication interface. The periodicity of transmissions may be based on configuration data.

The communication module may comprise a location unit configured to determine a geographical location of the module. The control unit may be configured to transmit the determined location using the telecommunications interface. The location unit may comprise a GNSS (Global Navigation Satellite System) unit, configured to determine the location of the module using the GNSS system. The location unit may be configured to determine the location of the module using the telecommunications interface. The location unit may be configured to estimate the location based on signal strength and triangulation between cell mast positions.

The communication module may be configured to operate in a slave configuration. The communication module may be configured to operate in an active slave configuration, in which the module is addressable by a PLC of the machine. The communication module may be configured to operate in a passive slave configuration, in which the communication module receives data transmitted by a PLC of the machine for receipt by one or more devices of the machine.

The communication module may be configured to operate in a master configuration, in which a PLC of the machine is a slave. The communication module may selectively operate in one of the passive slave configuration, active slave configuration and master configuration.

The operating configuration may be one of the passive slave configuration, active slave configuration and master configuration.

The communication module may be configured to receive module update data via the telecommunication interface, and install the received module update data.

The communication module may be configured to receive machine update data via the telecommunication interface and transmit the received machine update data to the machine via the serial interface.

The communication module may comprise an enclosure. The enclosure may have dimensions of under 100 mm×100 mm×100 mm, suitably under 75 mm×75 mm×75 mm, suitably approximately 50 mm×50 mm×50 mm.

According to a second aspect of the disclosure, there is provided a communication system for monitoring a machine, the system comprising:
- the communication module as defined in the first aspect;
- a machine connected to the serial interface of the communication module;
- a monitoring server configured to receive data from the communication module via a telecommunications network, and store the received data in a memory.

The monitoring server may comprise a graphical user interface configured to allow a user to view the received data.

The system may comprise a configuration portal. The configuration portal may be configured to receive configuration information related to the communication module, input by an operator. The portal may be hosted by a suitable server connected to the internet. The configuration information may include one or more of: configuration data linking the module to a mobile network operator data service for transmission over the telecommunications network; configuration data linking the module to a customer billing account for the data used by the module; and/or configuration data indicating a storage location for the data on the server. The configuration data may include machine type data indicating the type of machine to which the communication module is connected. The monitoring server may select a UI based on the machine type data. The configuration portal may transmit a configuration data to the communication module including the machine type data.

The configuration portal may be configured to receive an operating configuration selection, and transmit a configuration message to the communication module to operate in the selected configuration.

The memory may comprise a database to store the received data.

The machine may comprise a programmable logic controller (PLC) and a device controlled by the PLC. The machine may be one of a powered door, roller shutter, pumping station, dock leveller, car park barrier, walk-in freezer, solar panel, air conditioning unit, heating/ventilation unit, or horticultural irrigation system.

Further suitable features of the system of the second aspect are defined hereinabove in relation to the communication module of the first aspect and may be combined in any combination.

According to a third aspect of the disclosure there is provided a method of monitoring a machine, comprising: receiving, by a communication module, data from the machine via a serial interface; and sending, by the communication module, the received data over a telecommunications network to a monitoring server. The telecommunications interface is a GSM module configured to communicate over a GSM network. A control unit receives configuration data via the telecommunications interface, wherein the configuration data comprises one or more of: machine type data indicating data items of the machine to be monitored, retrieved from the machine via the serial interface and transmitted via the telecommunication interface; periodicity data indicating a periodicity of transmissions of the retrieved data items to be made by the communication module via the telecommunication interface; and operating configuration data, indicating the desired operating configuration of the communication module according to which the data items are to be retrieved.

Further suitable features of the method of the third aspect are defined hereinabove in relation to the communication module of the first aspect and system of the second aspect and may be combined in any combination.

BRIEF DESCRIPTION OF DRAWINGS

For a better understanding of the invention, and to show how embodiments of the same may be carried into effect, reference will now be made, by way of example only, to the accompanying diagrammatic drawings in which.

Figure 1:
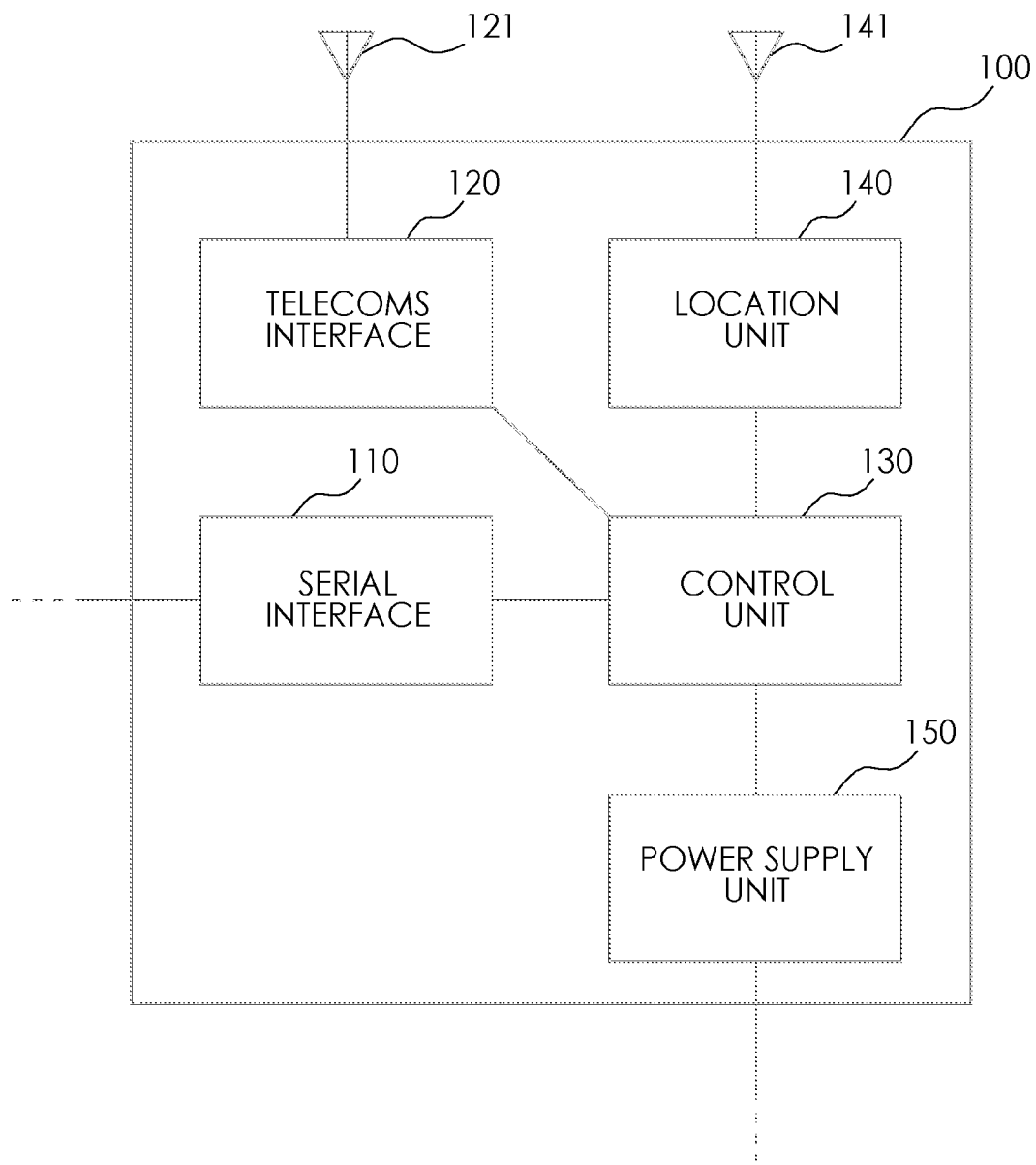
FIG. 1 is a schematic block diagram of an example communication module.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DESCRIPTION OF EMBODIMENTS

In overview, examples of the disclosure relate to a communication module comprising a serial interface connectable to a serial interface of a machine, and a wireless telecommunications interface connectable to a wireless telecommunications network. Accordingly, the communication module can be installed in a machine and provide monitoring information to a remote server.

Examples of the disclosure also relate to a system comprising a machine, a communication module connected to the machine via the serial interface, and a server, wherein the communication module can transmit or receive data to or from the server. The server may provide a user interface, such as a web interface, for monitoring the machine.

FIG. 1 shows an example communication module 100.

The communication module 100 is a hardware device, and may comprise a processor and a memory storing suitable instructions that, when executed, carry out the functions described herein. In other examples, the communication module 100 may comprise suitable hardware components, such as circuitry in the form of discrete or integrated components, a Field Programmable Gate Array (FPGA) or Application Specific Integrated Circuit (ASIC), which performs certain tasks or provides the associated functionality.

The communication module 100 may comprise an enclosure (not shown), to retain the components of the module 100. The enclosure may permit the communication module 100 to be installed within or on the enclosure of a machine 200. The enclosure may have example dimensions of 50 mm×50 mm×50 mm.

The communication module 100 comprises a serial interface 110. The serial interface 110 is configured to communicate with a machine 200, via a serial interface of the machine 200. For example, the serial interface 110 may comprise a serial port, connectable to a serial port of the machine 200 via a suitable serial cable.

The communications module 100 is configured to receive data from the machine 200 via the serial interface 110. In some examples, the communications module 100 is also configured to transmit data to machine 200 via the serial interface 110.

The serial interface 110 may be a Modbus interface, configured to communicate with the machine 200 using a Modbus protocol. Particularly, the serial interface 110 may allow the communication module 100 to communicate with a programmable logic controller (PLC) 210 of the machine 200 via the Modbus protocol. In other examples, the serial interface 110 may communicate with the machine 200 using another serial communications protocol. For example, the protocol may be an RS-485 protocol, an RS-232 protocol, a CAN (Controller Area Network) bus protocol, or any other suitable serial protocol.

The communication module 100 further comprises a telecommunications interface 120. The telecommunications interface 120 comprises suitable hardware, logic and instructions for communication over a wireless telecommunications network W. For example, the network W may be a GSM network. In other examples, the network may be a CDMA network. The network may comply with a 2G, 3G, 4G, EDGE, 5G, LTE or any other telecommunications network standard. For example, the telecommunications interface 120 may comprise a communication chip (e.g. a GSM chip). In some examples, the telecommunications interface 120 comprises an antenna 121. The antenna 121 may be disposed inside or outside the enclosure.

The communication module 100 further comprises a power supply unit 150. The power supply unit 150 may receive DC power, for example 24V DC power from a mains supply via a suitable transformer.

The communication module 100 also comprises a control unit 130, configured to control the operation of the module 100. The control unit 130 may comprise a processor. The control unit 100 is configured to transmit data received via the serial interface 110 using the telecommunications interface 120. The control unit 130 is configured to receive data via the telecommunications interface 120. The data received includes configuration data, as described herein. The control unit 130 may also be configured to transmit the received data to the machine 200 via the serial interface 110.

In one example, the control unit 130 is configured to periodically send data over the telecommunication interface 120. The periodicity of the transmissions may be varied, for example based on the received configuration data. Accordingly, the communication module 100 may receive a plurality of items of data from the machine 200, and then transmit the plurality of items of data over the telecommunication interface 120.

The communication module 100 may also comprise a location unit 140, configured to determine the geographical location of the module 100. In one example, the location unit 140 comprises a GNSS (Global Navigation Satellite System) unit, configured to determine the location of the module using the GNSS system, which includes GPS and GLONASS satellites S. In other examples, the location unit 140 comprises a GPS unit. The location unit 140 may comprise an antenna 141.

In further examples, the location unit 140 is configured to determine the location of the module 100 using the telecommunications interface 120. For example, the location unit 140 may estimate the location based on signal strength, and triangulation between cell mast positions.

In examples comprising the location unit 140, the control unit 130 is configured to transmit the determined location of the module 100 using the telecommunications interface 120.

In one example, the application software of the module 100 (e.g. the instructions forming part of the control unit 130) is embedded in vacant program space inside the telecommunication interface 120. For example, the application software is embedded in a GSM module.

Figure 2:
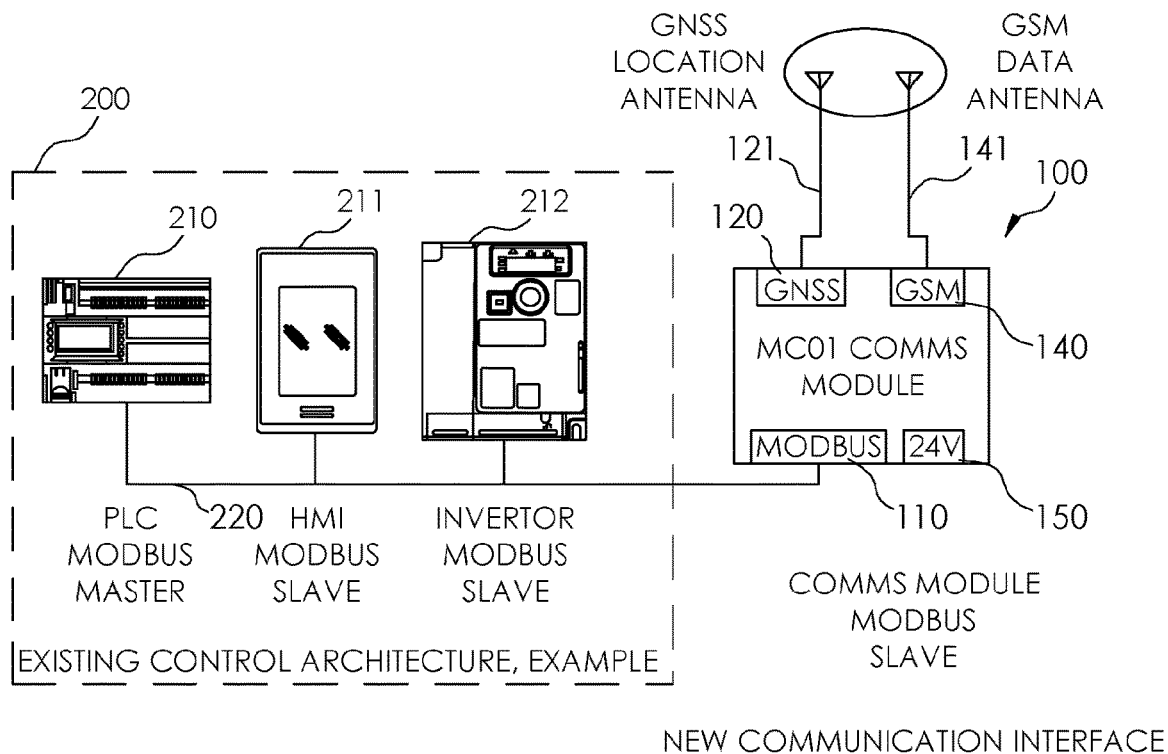
FIG. 2 is a schematic diagram illustrating the example communication module operating as a slave.

FIG. 2 shows the communication module 100 connected to a machine 200 in a slave configuration. The machine 200 comprises a PLC 210, and devices 211 and 212 controlled by the PLC 210. In the example of FIG. 2, the machine is an air conditioning control unit, and the devices 211 are a human machine interface (HMI) and an inverter 212. However, it will be understood that different machines serving different purposes may comprise different devices.

The PLC 210, and devices 211 and 212 are connected via a bus 220, which may be a serial Modbus connection. Furthermore, the communication module 100 is also connected to the bus 220 via the serial interface 110. In this configuration, the PLC 210 is the master device of the Modbus, with the devices 211, 212 and the communication module 100 acting as slave devices.

In one example, the communication module 100 is configured to operate as an active slave. In such an example, the communication module 100 may be directly addressed by the PLC 210. Accordingly, the PLC 210 is configured to send data over the bus 220 specifically intended for the communication module 100. For example, the PLC 210 may write relevant data items (e.g. particular variables or field such as uptime data, status data, etc) to the communication module 100. This mode may be suitable for new applications or machines, where the PLC 210 can be readily configured to write to the communication module 100, for example by suitably editing configuration settings or updating the firmware or other software of the PLC 210.

In another example, the communication module 100 is configured to operate as a passive slave. In such an example, in contrast to the active slave mode, the communication module 100 is not directly addressed by the PLC 210. Instead, the communication module 100 receives data transmitted over the bus 220 by the PLC 210 intended for receipt by the devices 211, 212. Accordingly, the communication module 100 effectively "eavesdrops" on the bus 220. This allows the communication module 100 to monitor the operation of the machine 200, by receiving control instructions and other instructions sent by the PLC 210 to the devices 211, 212. The control unit 130 may process the received data to extract relevant data items, for example based on suitable configuration data indicating particular fields or variable names to be retrieved.

The passive slave mode may be particularly suitable in circumstances when the module 100 is used with legacy applications or machines. In such circumstances, it may not be possible or desirable to update the PLC 210 such that it can directly address the communication module 100, but the mode still allows the communication module 100 to monitor the machine 200.

Figure 3:
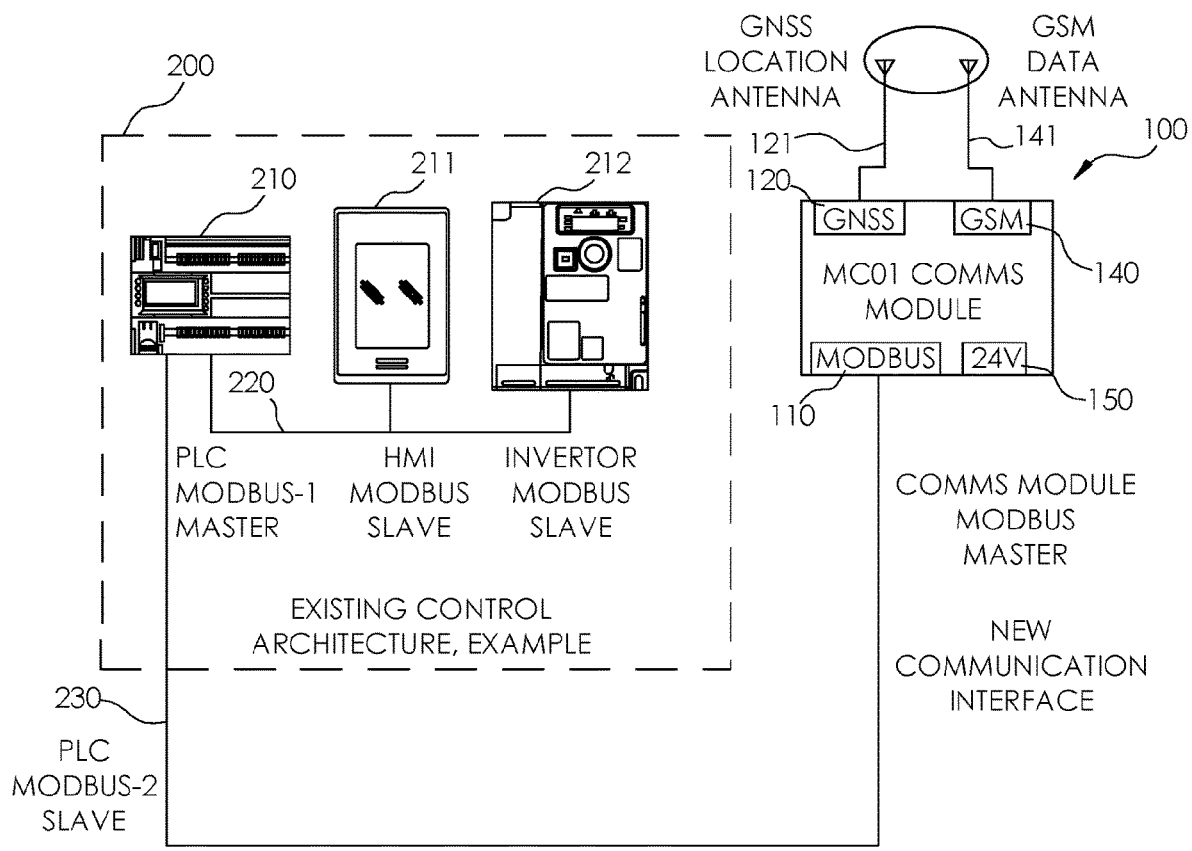
FIG. 3 is a schematic diagram illustrating the example communication module operating as a master.

FIG. 3 illustrates a further configuration of the communication module 100. In the illustrated configuration, the machine 200 is structured as discussed above, with a PLC 210 and devices 211, 212 connected by a first bus 220. In contrast to the configurations discussed above, in the configuration of FIG. 3, the communication module 100 and PLC 210 are connected by a second bus 230. For example, the PLC 210 or the machine 200 may comprise a Modbus slave port, to which the communication module 100 may be connected.

In this arrangement, the communication module 100 is configured to operate as the master device of the second bus 230, with the PLC 210 acting as a slave. Accordingly, the communication module 100 may directly address the PLC 210 via the bus 230 to retrieve the required data. Particularly, the module 100 may retrieve particular data items (e.g. particular fields or variables) from the memory of the PLC 210. This may for example be according to suitable configuration data of the communication module 100 indicating which data items should be retrieved.

In one example, the operating configuration of the module 100 may be selected according to received configuration data. Accordingly, the module 100 may be remotely configured to operate in the desired configuration.

Figure 4:
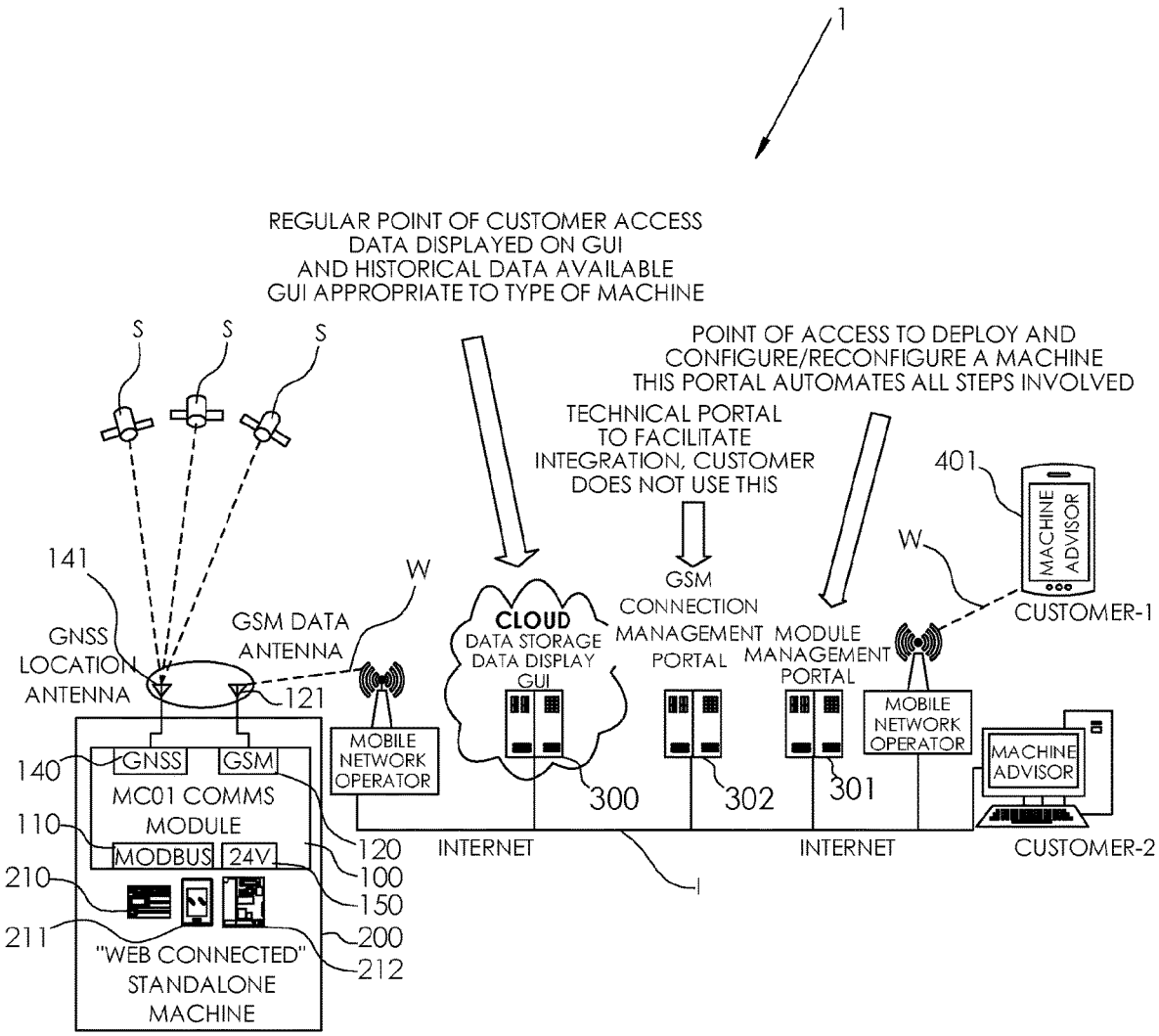
FIG. 4 is a schematic diagram of an example communication system.

FIG. 4 illustrates an example communication system 1. The communication system 1 comprises the communication module 100 and machine 200 discussed herein. In addition, the system 1 comprises a monitoring server 300.

The monitoring server 300 is connected to the communication module 100 via its telecommunications interface 120. For example, the telecommunications interface 120 may connect to a telecommunications network W, which in turn connects to the Internet I, wherein the monitoring server 300 is also connected to the internet I. It will be appreciated that the network connection between the communication module 100 and server 300 may comprise additional links, including other wide area networks, local networks, leased lines, virtual private networks and so on. In one example, the monitoring server 300 is hosted in the cloud. However, in other examples the monitoring server 300 may be hosted as a private server.

The monitoring server 300 is configured to store data received from the communication module 100. The monitoring server 300 may comprise a memory having a suitable database or other data storage structure in order to store the received data. The monitoring server 300 may also provide a GUI (e.g. a web site) to allow a user to view the received data, for example via a internet connected mobile device 401 or personal computer 402.

The system 1 may also comprise a configuration portal 301, via which an operator may input configuration information related to the communication module 100. The portal 301 may be hosted by a suitable server connected to the internet I. The configuration information may include one or more of: linking the module to a mobile network operator data service for transmission over the telecommunications network; linking the module to a customer billing account for the data used by the module; indicating a storage location for the data on the server 300; and indicating the type of machine 200 to which the communication module 100 is connected.

The operator may also select the mode of operation of the communication module 100 (e.g. active slave, passive slave, master), as well as the periodicity of the transmissions of the module 100. Accordingly, a configuration message comprising configuration data may be sent from the configuration portal 301, instructing the communication module 100 to operate in the desired mode, with the desired machine type and the desired periodicity.

The system 1 may also comprise a connection management portal 302, via which an operator may manage and configure the wireless telecommunications link of the module 100. This may include determining the connection status of the module 100 over the network.

In use, the communication module 100 is installed in the machine 200. This may include connecting the serial interface 110 to a suitable serial port of the machine 200, and connecting the power supply unit 150 to a suitable power source.

Once the communication module 100 is powered, the installer may use the configuration portal 301 to set up the module 100. Particularly, the installer may indicate the type of the machine 200 to which the module is connected (e.g. one of a powered door, roller shutter, pumping station, dock leveller, car park barrier, walk-in freezer, solar panel, air conditioning unit, heating/ventilation unit, horticultural irrigations system etc). This configures the module 100 to retrieve the appropriate data from the machine 200 via the serial interface 110. It will be appreciated that way in which the relevant data will be retrieved will depend on the operation mode of the module 100. Accordingly, a mapping is provided between variables or fields used by machine 200 and storage locations (e.g. database fields) in the memory of the server 300. The selection of the machine type may also cause the selection of an appropriate corresponding user interface for display via the server 300.

The installer may also use the configuration portal 301 to link the module 100 to a particular data service, billing account and storage location on the server, as well as indicating the operation mode of the module 100. This may cause instructions to be to be transmitted to the communication module 100 from the configuration portal 301 to cause the module 100 to operate in the specified mode.

In one example, the installer may also use the configuration portal 301 to set the periodicity of transmissions sent by the communication module 100. More frequent transmissions may ensure that the data stored at the server 300 is more up to date, but that less frequent transmissions may reduce data consumption and associated charges.

Once installed, the communication module 100 receives data from the machine 200 via the serial interface 110. The received data is then transmitted to the server 300 using the telecommunications interface 120. Upon receipt at the server 300, the data is stored.

Subsequently, a user seeking to monitor the machine 200 may access the server 300, whereupon a GUI is displayed showing the data received from the module 100 in an appropriately labelled format. Accordingly, the data may allow the user to determine the current status of the machine 200. Furthermore, the stored data may permit an analysis of the historic operation of the machine 200, which may be useful in ensuring efficient operation of the machine, reducing energy costs and increasing throughput.

In some examples, once installed, the module 100 may be updated via the telecommunications interface 120. That is to say, the module 100 may receive a software or firmware update via the telecommunications interface 120, and the control unit 130 may be configured to install the update. In some examples, once installed, the module 100 may also receive and apply updates to the machine 200, for example the PLC 210 of the machine.

Figure 5:
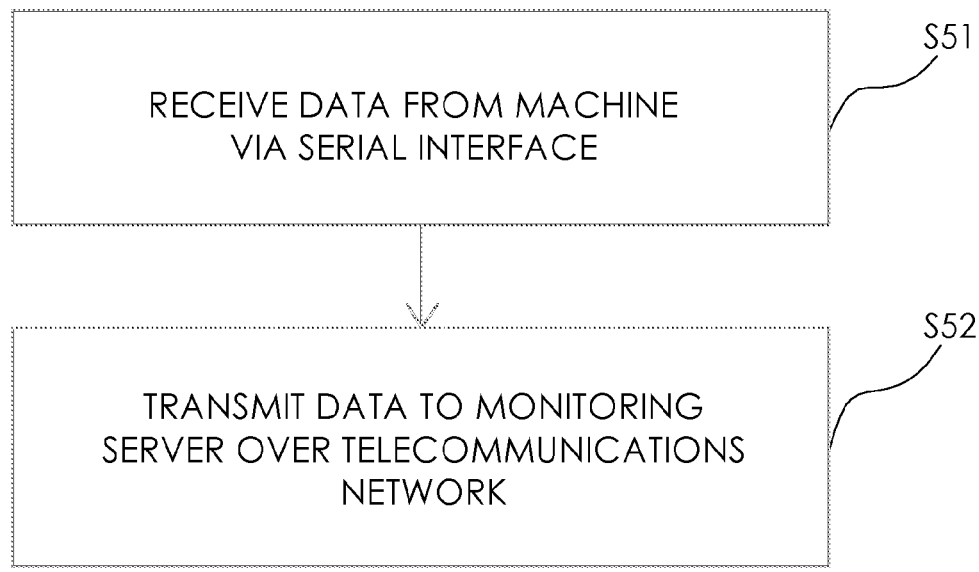
FIG. 5 is a schematic flowchart of an example communication method.

Turning to FIG. 5, an example communication method is illustrated. In block S51, data is received by a serial interface of a communication module from a machine. In block S52, the received data is sent by the communication module over a telecommunications network to a monitoring server. The communication module, machine and monitoring server may be as described herein. The method may comprise further steps as disclosed herein.

Advantageously, the above-described modules, systems and methods provide a means of providing network connectivity to a wide range of industrial machinery, thereby providing a means of remotely monitoring such machines. The module is low cost, and thus is appropriate for relatively low-cost standalone machines where providing network connectivity would otherwise be cost prohibitive. The module is capable of operating in a number of modes, which allow it to interface with a wide variety of machines, and permit it to be retrofitted to legacy machines which may not otherwise support network connectivity.

The module is advantageously easy to install and configure, allowing it to be allowing it to be installed by an operator without detailed knowledge of network configuration and programming. Particularly, the operator may simply select the type of machine to which the module is selected so as to retrieve an appropriate configuration profile indicating which variables are to be extracted from the machine, and the UI layout via which they are displayed to a user. Furthermore, the module may be readily updated over the air, and facilitate updates to the machine.

In addition, the above-described modules, systems and methods transmit data from the machine to a server hosted remotely from the machine, for example in the cloud. This ensures the data can be accessed, regardless of whether the machine is in operation.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A communication module for monitoring a machine, comprising:
a serial interface connectable to a serial interface of the machine;
a telecommunications interface connectable to a telecommunications network, wherein the telecommunications interface is a Global System for Mobile communication (GSM) module configured to communicate over a GSM network; and
a control unit configured to control operation of the communication module, the control unit being further configured to transmit data received via the serial interface to a monitoring server via the telecommunications interface;
the control unit being further configured to receive configuration data via the telecommunications interface, wherein the configuration data comprises:
machine type data indicating data items of the machine to be monitored, retrieved from the machine via the serial interface and transmitted via the telecommunication interface;
periodicity data indicating a periodicity of transmissions of the retrieved data items to be made by the communication module via the telecommunication interface; and
operating configuration data, indicating the desired operating configuration of the communication module according to which the data items are to be retrieved.

2. The communication module of claim 1, wherein the serial interface is a Modbus interface configured to communicate with the machine using a Modbus protocol.

3. The communication module of claim 1, wherein the control unit is configured to periodically send data over the telecommunication interface.

4. The communication module of claim 1, wherein:
the communication module comprises a location unit configured to determine the geographical location of the module, and
the control unit is configured to transmit the determined location using the telecommunications interface.

5. The communication module of claim 1, in which the communication module is configured to operate in an active slave configuration, in which the module is addressable by a Programmable Logic Controller (PLC) of the machine.

6. The communication module of claim 1, wherein the communication module is configured to operate in a passive slave configuration, in which the communication module is configured to receive data transmitted by a Programmable Logic Controller (PLC) of the machine for receipt by one or more devices of the machine.

7. The communication module of claim 1, wherein the communication module is configured to operate in a master configuration, in which a Programmable Logic Controller (PLC) of the machine is a slave.

8. The communication module of claim 1, further configured to:
receive module update data via the telecommunication interface, and
install the received module update data.

9. The communication module of claim 1, further configured to:
receive machine update data via the telecommunication interface, and
transmit the received machine update data to the machine via the serial interface.

10. The communication module of claim 1, comprising an enclosure, wherein the enclosure has dimensions of under 100 mm×100 mm×100 mm.

11. A communication system for monitoring a machine, the system comprising:
a machine;
a communication module for monitoring the machine; and
a monitoring server configured to receive data from the communication module via a telecommunications network, and store the received data in a memory;
wherein the communication module comprises:
a serial interface of the communication module connected to a serial interface of the machine;
a telecommunications interface connectable to the telecommunications network, wherein the telecommunications interface is a Global System for Mobile communication (GSM) module configured to communicate over a GSM network; and
a control unit configured to control operation of the communication module, the control unit being further configured to transmit data received via the serial interface of the communication module to the monitoring server via the telecommunications interface;
the control unit being further configured to receive configuration data via the telecommunications interface, wherein the configuration data comprises:
machine type data indicating data items of the machine, retrieved from the machine via the serial interface of the machine and transmitted via the telecommunication interface;
periodicity data indicating a periodicity of transmissions of the retrieved data items to be made by the communication module via the telecommunication interface; and
operating configuration data, indicating the desired operating configuration of the communication module according to which the data items are to be retrieved.

12. The system of claim 11, wherein the monitoring server comprises a graphical user interface to allow a user to view the received data.

13. The system of claim 11, comprising a configuration portal, the configuration portal configured to receive configuration information related to the communication module input by an operator.

14. The system of claim 13, wherein the configuration information includes one or more of:
configuration data linking the module to a mobile network operator data service for transmission over the telecommunications network;
configuration data linking the module to a customer billing account for the data used by the module; and/or
configuration data indicating a storage location for the data on the server.

15. The system of claim 13, wherein the configuration data includes machine type data indicating the type of machine to which the communication module is connected, and wherein the configuration portal is configured to transmit a configuration message to the communication module including the machine type data.

16. The system of claim 13, wherein the configuration portal is configured to receive an operating mode selection, and transmit a configuration message to the communication module to operate in the selected mode.

17. The system of claim 11, wherein the machine is one of a powered door, roller shutter, pumping station, dock leveller, car park barrier, walk-in freezer, solar panel, air conditioning unit, heating/ventilation unit, or horticultural irrigation system.

18. A method of monitoring a machine, comprising:
receiving, by a communication module, data from the machine via a serial interface; and
sending, by the communication module, the received data over a telecommunications network to a monitoring server wherein the telecommunications interface is a GSM module configured to communicate over a GSM network;
a control unit receives configuration data via the telecommunications interface, wherein the configuration data comprises:
machine type data indicating data items of the machine to be monitored, retrieved from the machine via the serial interface and transmitted via the telecommunication interface;
periodicity data indicating a periodicity of transmissions of the retrieved data items to be made by the communication module via the telecommunication interface; and
operating configuration data, indicating the desired operating configuration of the communication module according to which the data items are to be retrieved.

* * * * *